Figure 1:
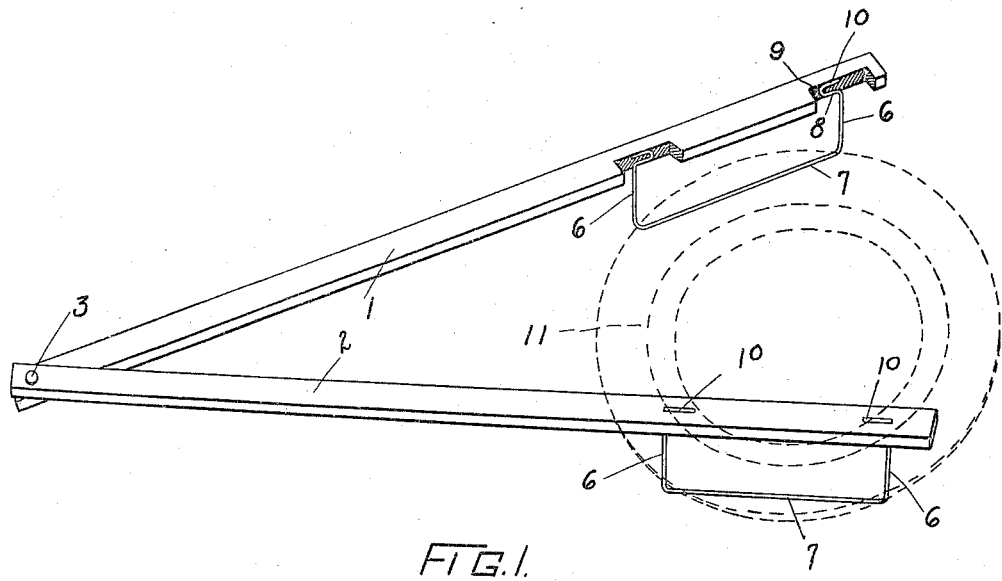

J. EDEN.
HOLDER.
APPLICATION FILED AUG. 16, 1915.

1,228,420.

Patented June 5, 1917.

INVENTOR
JOHN EDEN
BY
ATTORNEY

UNITED STATES PATENT OFFICE.

JOHN EDEN, OF ATTLEBORO, MASSACHUSETTS.

HOLDER.

1,228,420.

Specification of Letters Patent.

Patented June 5, 1917.

Application filed August 16, 1915. Serial No. 45,619.

*To all whom it may concern:*

Be it known that I, JOHN EDEN, a citizen of the United States, residing at Attleboro, county of Bristol, Commonwealth of Massachusetts, have invented certain new and useful Improvements in Holders, of which the following is a specification.

This invention relates to plate holders and particularly to a device adapted to be used as a tongs for removing hot plates and the like from a stove.

The object of the present invention is to provide a simple, inexpensive and serviceable article of this class, which may be readily manipulated and whereby the heated plate or other object may be effectively gripped and removed without danger of burning the hands or dropping the plate.

The device of the present invention consists essentially of a pair of lever or handle members pivotally connected with each other near one end, and a pair of plate engaging devices carried by said members near their opposite ends. Each plate engaging member is formed as an open sided one piece loop device having a pair of suspension arms provided with suitably formed attaching ends, whereby the arms may be securely engaged with a handle and a relatively straight plate supporting portion connecting the lower ends of said arms and extending in the direction of length of its handle member, and substantially parallel thereto.

The plate supporting portions are adapted to be inserted under the plate near opposite sides and the arms engage the periphery of the plate at proper points and when the levers are brought toward each other grip and serve to prevent the plate from slipping out of the loops.

Figure 2:
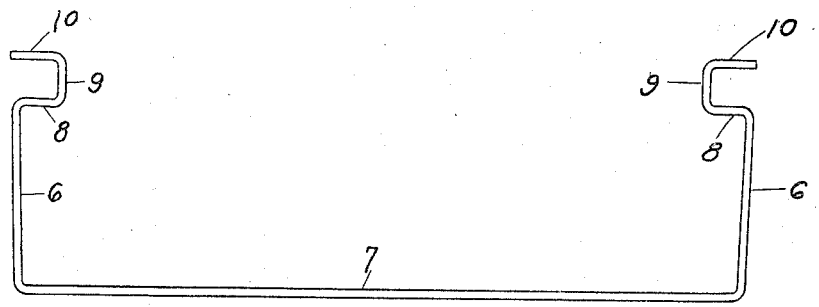

The construction and manner of using my device will be more fully disclosed in the specification which follows. Throughout specification and drawings like reference numerals are employed to indicate corresponding parts, and in the drawings:

Figure 1 is a perspective view of a plate holder in accordance with my invention, and illustrating the manner of use thereof, one of the handle members being partially broken away to show a preferred form of connection for the plate engaging bail, and Fig. 2 is a detail view of one of the bails removed.

I have indicated at 1 and 2, respectively, a pair of crossed handles or levers, pivotally connected to each other at their crossed ends by a pivot element 3. The handles 1 and 2 may be provided with any suitable heat insulating covering, if desired.

In the form selected as illustrative of my invention, the levers 1 and 2 are constructed of wood. Each lever carries near its free end a one-piece U-shaped or bail-shaped plate engaging device, and where wood is the material used in the handles, these devices are specially formed to provide a secure and neat engagement with the handles.

Each device consists of a wire loop bent in the form shown in Fig. 2, in which the loop extends as a pair of spaced, substantially parallel suspension arms 6 connected at their lower ends by a plate supporting portion 7 which is disposed below and substantially parallel to its lever 1 or 2. The free ends of the arms 6 are given a hook like conformation whereby to securely engage the levers 1 and 2. Each hook end consists of a horizontally deflected inwardly bent portion 8, a vertically extending portion 9, and an outwardly bent portion 10 spaced from and disposed substantially parallel to said portion 8. The handles 1 and 2 are suitably bored to receive these hook ends and the portions 10 are clenched in the wood of the handles. The portions 8 and 10 are therefore disposed on opposite sides of a handle and bent in opposite directions.

In use, the handles are opened to a degree sufficient to permit the portions 7 of the loops to be inserted under the edges of a hot plate or other object 11 near opposite sides thereof. The levers are then brought together causing the arms 6 to grip the peripheral edge of the plate and thereby assist to prevent the plate slipping off the portions. The plate may then be lifted from the stove without danger of burning the hands or dropping the plate. The engagement is released by simply opening the levers.

It will be evident therefore that the present device provides a simple, inexpensive and serviceable article of this class which is capable of facile manipulation and which effectively and positively grips the plate. It will also be evident that the device is capable of use with plates and other objects which vary considerable in area.

Various modifications in the form and construction of my device may obviously be resorted to without departing from the spirit of my invention if within the limits of the appended claims.

What I therefore claim and desire to secure by Letters Patent is:

1. A device of the class described consisting of a pair of flat handle or lever members pivoted at one end in superposed, flatwise relation, flat U-shaped plate engaging loops or bails carried upon one side of the pair of levers, one on each lever, and projecting perpendicularly therefrom so that when the levers are swung together the loops or bails lie substantially parallel in close relation within a space of the width of the closed overlapping levers.

2. In a device of the class described, a pair of pivoted lever members, and article engaging devices depending vertically from said members and each formed as an open sided loop having an article supporting portion spaced from and substantially parallel to and extending in the direction of length of its lever member below the same, and spaced perpendicular article engaging arms connected to said supporting portions at their ends and having their free ends formed for positive engagement with said lever members, the said arms projecting perpendicularly from one side of the pair of lever members in a direction parallel with the pivotal axis of the levers.

3. A device of the class described consisting of a pair of handle or lever members connected at one end for relative angular movement, each member having a flat U-shaped bail or loop secured therein so as to project perpendicularly from one side of the pair of members, said loops adapted to lie in close, substantially parallel relation in a space the width of the closed members.

In testimony whereof I affix my signature in presence of two witnesses.

JOHN EDEN.

Witnesses:
 WALTER A. BRIGGS,
 GRACE E. WILKINSON.

Copies of this patent may be obtained for five cents each, by addressing the "Commissioner of Patents, Washington, D. C."